United States Patent
Sugawara et al.

(10) Patent No.: US 8,804,312 B2
(45) Date of Patent: Aug. 12, 2014

(54) ELECTROCONDUCTIVE POLYMER COMPOSITION, METHOD FOR PRODUCING THE SAME, AND SOLID ELECTROLYTIC CAPACITOR USING ELECTROCONDUCTIVE POLYMER COMPOSITION

(75) Inventors: Yasuhisa Sugawara, Miyagi (JP); Tomoki Nobuta, Miyagi (JP); Naoki Takahashi, Miyagi (JP); Ryuta Kobayakawa, Miyagi (JP); Satoshi Suzuki, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 393 days.

(21) Appl. No.: 13/147,313

(22) PCT Filed: Feb. 3, 2010

(86) PCT No.: PCT/JP2010/051486
§ 371 (c)(1),
(2), (4) Date: Jan. 20, 2012

(87) PCT Pub. No.: WO2010/090206
PCT Pub. Date: Aug. 12, 2010

(65) Prior Publication Data
US 2012/0120557 A1  May 17, 2012

(30) Foreign Application Priority Data
Feb. 3, 2009  (JP) .................................. 2009-022110

(51) Int. Cl.
*H01G 9/02* (2006.01)
*H01B 1/00* (2006.01)

(52) U.S. Cl.
USPC ............................ 361/525; 361/523; 252/500

(58) Field of Classification Search
None
See application file for complete search history.

(56) References Cited

U.S. PATENT DOCUMENTS

| | | | |
|---|---|---|---|
| 5,300,575 A | 4/1994 | Jonas et al. | |
| 6,110,234 A | 8/2000 | Sakata et al. | |
| 6,190,805 B1 * | 2/2001 | Takeuchi et al. | 429/307 |
| 6,987,663 B2 * | 1/2006 | Merker et al. | 361/523 |
| 7,683,109 B2 * | 3/2010 | Yoshida et al. | 523/523 |
| 2004/0152832 A1 | 8/2004 | Kirchmeyer et al. | |
| 2006/0062958 A1 | 3/2006 | Yoshida et al. | |
| 2006/0187617 A1 | 8/2006 | Toida et al. | |

FOREIGN PATENT DOCUMENTS

| | | | | |
|---|---|---|---|---|
| JP | 2636968 B2 | | 4/1997 | |
| JP | 3251208 B2 | | 11/2001 | |
| JP | 2003-213148 A | | 7/2003 | |
| JP | 2006-156890 A | | 6/2006 | |
| JP | 2006-228679 A | | 8/2006 | |
| JP | 2007-45932 A | | 2/2007 | |
| JP | 4077675 B2 | | 2/2008 | |
| JP | 2008-253012 A | | 10/2008 | |
| JP | 2008253012 | * | 10/2008 | ............. H02N 13/00 |

* cited by examiner

*Primary Examiner* — Jayprakash N Gandhi
*Assistant Examiner* — Dion R Ferguson
(74) *Attorney, Agent, or Firm* — Foley & Lardner LLP

(57) ABSTRACT

An exemplary embodiment of the invention provides an electroconductive polymer composition having high electroconductivity which is suitable for a solid electrolytic capacitor, and provides a solid electrolytic capacitor having low ESR as well as low leakage current (LC). In an exemplary embodiment of the invention, an electroconductive polymer composition having high electroconductivity is formed by drying an electroconductive polymer suspension solution which comprises a polyanion having a cross-linked structure, an electroconductive polymer, and a solvent. In an exemplary embodiment of the invention, a solid electrolytic capacitor having low ESR as well as low LC is obtained by using the electroconductive polymer composition for a solid electrolyte layer that is an electroconductive polymer layer.

8 Claims, 1 Drawing Sheet

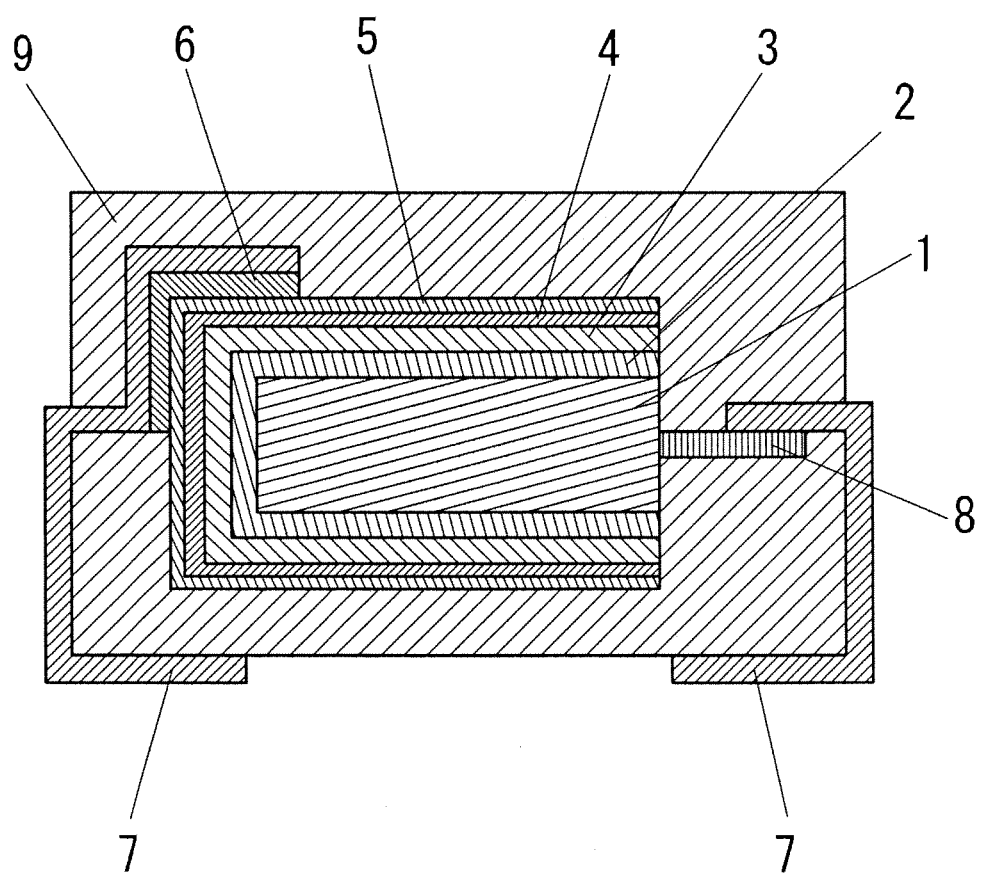

though this application is the National Phase of PCT/JP2010/
ELECTROCONDUCTIVE POLYMER COMPOSITION, METHOD FOR PRODUCING THE SAME, AND SOLID ELECTROLYTIC CAPACITOR USING ELECTROCONDUCTIVE POLYMER COMPOSITION This application is the National Phase of PCT/JP2010/051486, filed Feb. 3, 2010, which claims priority to Japanese Application No. JP2009-022110, filed Feb. 3, 2009, the disclosures of which are hereby incorporated by reference in their entirety.

BACKGROUND OF THE INVENTION

1. Field of the Invention

An exemplary embodiment of the invention relates to an electroconductive polymer composition, a method for producing the same, and a solid electrolytic capacitor using an electroconductive polymer composition.

2. Description of the Related Art

Electroconductive polymer materials are used for electrodes of capacitors, electrodes of dye-sensitized solar cells, electrodes of electroluminescence displays and the like. For such electroconductive polymer materials, the polymer materials by polymerizing pyrrole, thiophene, 3,4-ethylenedioxy thiophene, aniline, or the like are known. In particular, the electroconductive polymer materials formed using the electroconductive polymer suspension solution using a polyanion as a dopant, which are disclosed in Patent documents 1 and 2, show high electroconductivity, and thereby generate a great interest in the fields of electronic materials and the like.

Patent document 1 relates to a solution (dispersion) of polythiophene and a method for producing the same, and to the use of a salt to an antistatic treatment of a plastic molded article. Patent document 2 relates to a water dispersion of a complex between poly(3,4-dialkoxythiophene) and a polyanion and a method for producing the same, and to a coating composition containing the water dispersion and a coated substrate having a transparent electroconductive film formed by applying the composition. The above-mentioned Patent documents 1 and 2 both relate to a polythiophene consisting of structural units of 3,4-dialkoxy thiophene, a solution of a polythiophene containing a polyacid ion derived from a polystyrene sulfonic acid, and a method for producing the same, and to the use of a salt to an antistatic treatment of a plastic molded article.

In the above-mentioned method for forming an electroconductive polymer composition by using an electroconductive polymer suspension solution, there is an advantage that an electroconductive polymer composition having high electroconductivity can easily be obtained only by drying the solution. Thus, the method is progressively applied to a solid electrolytic capacitor using the electroconductive polymer composition as a solid electrolyte, instead of the method for forming an electroconductive polymer by conventional chemical oxidative polymerization or electropolymerization method. If an electroconductive polymer composition is used as a solid electrolyte of a solid electrolytic capacitor, an electroconductive polymer layer having a thickness of a certain level or more on a dielectric film is necessary to suppress a leakage current (hereinafter referred to as LC) when the capacitor is implemented to a substrate as described in Patent document 3. Patent document 3 relates to a method for forming a polypyrrole layer of 5 μm or more as a solid electrolyte of a solid electrolytic capacitor by using chemical oxidative polymerization method.

When a capacitor is implemented to a substrate, thermal stress of an outer packaging resin is applied to an oxide film and the oxide film damages, and thereby LC may increase. However, if an electroconductive polymer layer is formed on an oxide film, the oxide film locally produces heat by LC increasing, and the electroconductive polymer layer formed thereon is thermally oxidized and in due course has a loss of electroconductivity. As a result, an electric current is interrupted to defected part of the oxide film, and thereby LC comes back to a normal level even if it temporarily increases.

However, if there is no electroconductive polymer layer on an oxide film, naturally, the above-mentioned insulation restoration is not taken place, and thereby LC increasing is actualized and comes to be a problem. Also, even if an electroconductive polymer layer is formed on an oxide film, if the film is thin, there is generated a trouble that LC increases after substrate implementation, and enough film thickness must be secured.

The cause of LC increasing after substrate implementation in the case of an thin electroconductive polymer layer is not clear. However, as one of the causes, LC is thought to increase due to the above-mentioned cause because an electroconductive polymer layer slips by thermal stress at the time of substrate implementation and there is generated a microscopic area in which an electroconductive polymer layer is not formed on an oxide film.

The problem regarding LC of the above-mentioned electrolytic capacitor exists not only in the electroconductive polymer obtained by chemical oxidative polymerization but also in the electroconductive polymer obtained by drying an electroconductive polymer suspension solution.

As a simple method for forming on an oxide film of an electrolytic capacitor an electroconductive polymer composition obtained by drying an electroconductive polymer suspension solution, there is performed a formation method which has immersing a valve metal powder sintered body on which an oxide film is formed or a valve metal body on which etching treatment is performed to an electroconductive polymer suspension solution and thereafter drying.

In the case of this method, if the electroconductive polymer suspension solution does not have a certain level of viscosity, only a small amount of the electroconductive polymer suspension solution can adhere to a valve metal powder sintered body on which an oxide film is formed or a valve metal body on which etching treatment is performed, and thereby there is a problem that only a small amount of the electroconductive polymer is formed and the electroconductive polymer layer comes to be thin. In particular, the electroconductive polymer layer formed at the edge part is thinly formed.

It is possible to thickly form a electroconductive polymer layer by performing plural times immersing and drying steps to the electroconductive polymer suspension solution. However, the formed electroconductive polymer layer has layered formation, and thereby there is a problem that interface resistance is generated between the layers and that the obtained solid electrolytic capacitor comes to have high equivalent series resistance (hereinafter, ESR). Therefore, it is expected to develop an electroconductive polymer suspension solution having a high viscosity which makes it possible to obtain an electroconductive polymer layer having a thickness of a certain level or more by one set of immersing and drying step to an electroconductive polymer suspension solution.

As a method for increasing a viscosity of an electroconductive polymer suspension solution, there is developed a method to add a thickener as described in Patent document 4. Patent document 4 relates to an electroconductive composition containing a water-soluble electroconductive polymer having a sulfonic acid group and/or a carboxyl group, a cross-linking agent, water, organic solvent, and thickener. However, the thickener described in Patent document 4 is an insulating water-soluble polymer, and thereby there is a problem that electroconductivity of the electroconductive polymer composition is damaged if such the insulating component exists in the electroconductive polymer composition. Also, in the case of using the electroconductive polymer composition which contains an insulating thickener in the electroconductive polymer layer of the solid electrolytic capacitor, there is also a similar problem that ESR of the solid electrolytic capacitor comes to be higher.

PRIOR ART DOCUMENT

Patent Document

Patent document 1: JP 2636968 B
Patent document 2: JP 4077675 B
Patent document 3: JP 3251208 B
Patent document 4: JP 2003-213148 A

SUMMARY OF THE INVENTION

Problem to be Solved by the Invention

An object of an exemplary embodiment of the invention is to provide an electroconductive polymer composition having high electroconductivity which provides a thick layer by the small number of adhesion steps, and a method for producing the same, and to provide a solid electrolytic capacitor having low ESR as well as low LC.

Means for Solving the Problem

In order to solve the above-mentioned problem, an exemplary embodiment of the invention has a following constituent.

An electroconductive polymer composition according to an exemplary embodiment of the invention is formed by drying an electroconductive polymer suspension solution which comprises a polyanion having a cross-linked structure, an electroconductive polymer, and a solvent. Also, the polyanion having a cross-linked structure may have a main chain of a polystyrene sulfonic acid. Also, the polyanion having a cross-linked structure may have a structure obtained by cross-linking a straight-chain polystyrene sulfonic acid using a cross-linking agent. Also, the cross-linking agent may be a compound having two or more epoxy groups. Also, the electroconductive polymer may be a polymer obtained by polymerizing at least one monomer selected from pyrrole, thiophene, furan, and derivatives thereof. Further, the electroconductive polymer suspension solution may have a viscosity of 10 to 1000 mPa·s.

A method for producing an electroconductive polymer composition according to an exemplary embodiment of the invention comprises:

a first step of synthesizing a polyanion having a cross-linked structure by a reaction of a cross-linking agent with a polyanion in an aqueous solvent;

a second step of obtaining a mixture containing an electroconductive polymer by chemical oxidative polymerization of a monomer giving the electroconductive polymer by using an oxidant in a solvent containing a dopant consisting of an organic acid or a salt thereof, a third step of collecting the electroconductive polymer from the mixture, a fourth step of forming an electroconductive polymer suspension solution by mixing the polyanion having a cross-linked structure and the electroconductive polymer with an oxidant in the aqueous solvent, and a fifth step of drying the electroconductive polymer suspension solution.

Also, the dopant may be at least one monosulfonic acid selected from benzenesulfonic acid, naphthalenesulfonic acid, camphorsulfonic acid, and derivatives thereof, and salts of these. Also, the monomer may be at least one selected from pyrrole, thiophene, furan, and derivatives thereof.

A solid electrolytic capacitor according to an exemplary embodiment of the invention is obtained by using the electroconductive polymer composition for an electroconductive polymer layer that is a solid electrolyte layer. Also, it may be obtained by forming the electroconductive polymer composition with a thickness of 5 μm or more as the electroconductive polymer layer that is a solid electrolyte layer on a dielectric film layer which is formed on a surface of an anode conductor consisting of a valve metal.

Effect of the Invention

As described above, it results in increasing a viscosity of an electroconductive polymer suspension solution that the electroconductive polymer suspension solution contains a polyanion having a cross-linked structure. And, by using the electroconductive polymer suspension solution, a thick electroconductive polymer layer which does not have layered formation but has a thickness of a certain level or more can be formed by one set of immersing to the electroconductive polymer suspension solution and drying step. As a result, in the case of applying it to a solid electrolytic capacitor, a solid electrolytic capacitor having low ESR as well as low LC can be obtained.

Also, electroconductivity does not decrease, unlike to a conventional insulating thickener at all, even if a polyanion having a cross-linked structure exists in an electroconductive polymer composition obtained from an electroconductive polymer suspension solution because it is a dopant of an electroconductive polymer. As a result, the obtained electroconductive polymer composition has high electroconductivity, a solid electrolytic capacitor having low ESR can be obtained by using the electroconductive polymer composition for an electroconductive polymer layer that is a solid electrolyte layer.

Table 1 shows a comparison between Prior art 1 disclosed in Patent document 1, Prior art 2 disclosed in Patent document 4 and an exemplary embodiment of the invention.

TABLE 1

| Technology | Item | Explanation |
| --- | --- | --- |
| Prior art 1 (Patent document 1) | An electroconductive polymer suspension solution | It contains an electroconductive polymer particulate in which a polyanion is a dopant. |
| | An electroconductive polymer composition | It has high electroconductivity. |

TABLE 1-continued

| Technology | Item | Explanation |
|---|---|---|
| | A solid electrolytic capacitor using an electroconductive polymer composition | LC is high because an electroconductive polymer layer comes to have a thin thickness in the case of performing one set of immersing and drying step. ESR is high because an electroconductive polymer layer comes to have layered formation in the case of performing plural times immersing and drying steps. |
| Prior art 2 (Patent document 4) | An electroconductive polymer suspension solution | It contains an electroconductive polymer particulate in which a polyanion is a dopant and an insulating thickener. |
| | An electroconductive polymer composition | It has low electroconductivity because it contains an insulating thickener. |
| | A solid electrolytic capacitor using an electroconductive polymer composition | LC is low because an electroconductive polymer layer comes to have an enough thickness by one set of immersing and drying step. ESR is high because an insulating thickener is contained. |
| An exemplary embodiment of the invention | An electroconductive polymer suspension solution | It contains an electroconductive polymer in which a polyanion having a cross-linked structure is a dopant. |
| | An electroconductive polymer composition | It has high electroconductivity. |
| | A solid electrolytic capacitor using an electroconductive polymer composition | LC is low because an electroconductive polymer layer comes to have an enough thickness by one set of immersing and drying step. ESR is low because no insulating thickener is contained. |

As shown in Table 1, an electroconductive polymer suspension solution of an exemplary embodiment of the invention has a composition different from that of the prior arts, and an electroconductive polymer composition of an exemplary embodiment of the invention is different from that of the prior arts. An exemplary embodiment of the invention can provide a solid electrolytic capacitor having low ESR as well as low LC using an electroconductive polymer composition for a solid electrolyte layer.

BRIEF DESCRIPTION OF DRAWINGS

FIG. 1 is a sectional view showing a structure of a solid electrolytic capacitor according to an exemplary embodiment of the invention.

MODE FOR CARRYING OUT THE INVENTION

As follows, an electroconductive polymer composition formed using an electroconductive polymer suspension solution according to an exemplary embodiment of the invention, a method for producing the same, and a solid electrolytic capacitor using an electroconductive polymer composition for an electroconductive polymer layer that is a solid electrolyte layer are explained in detail.

A polyanion having a cross-linked structure contained in an electroconductive polymer suspension solution according to an exemplary embodiment of the invention preferably has a main chain of a polyacid such as a polystyrene sulfonic acid, a polyvinyl sulfonic acid, a polymaleic acid, or a polyacrylic acid. From the viewpoint of dispersibility to a solution of an electroconductive polymer and electroconductivity, the polyanion having a cross-linked structure particularly preferably has a main chain of a polystyrene sulfonic acid.

A polyanion having a cross-linked structure preferably has a structure obtained by cross-linking a straight-chain polyanion using a cross-linking agent. This cross-linking agent for cross-linking the main chains of the polyanion to each other is not limited as long as it has two or more functional groups which is reacted with the functional groups of the polyanion, but preferably has two or more functional groups which are selected from epoxy group, isocyanate group, carboxyl group, amino group, hydroxyl group, mercapto group and the like. A cross-linking agent having two or more epoxy groups is particularly preferable because of high reactivity to sulfonic group contained in a polystyrene sulfonic acid.

Examples of a compound having two or more epoxy groups include sorbitol polyglycidyl ethers, polyglycerol polyglycidyl ethers, pentaerythritol polyglycidyl ethers, diglycerol polyglycidyl ethers, glycerol polyglycidyl ethers, trimethylolpropane polyglycidyl ethers, resorcinol diglycidyl ether, neopentyl glycol diglycidyl ether, 1,6-hexanediol diglycidyl ether, polyethylene glycol diglycidyl ethers, polypropylene glycol diglycidyl ethers, polybutadiene diglycidyl ethers, diglycidyl o-phthalate, hydroquinone diglycidyl ether, diglycidyl terephthalate, dibromo neopentyl glycol diglycidyl ether, bisphenol A type epoxy resins.

It is not at all a problem that the cross-linking agent is used alone or is used in combination of two or more kinds in an arbitrary ratio.

An electroconductive polymer contained in an electroconductive polymer suspension solution according to an exemplary embodiment of the invention is preferably a polymer obtained by polymerizing at least one monomer selected from pyrrole, thiophene, furan and derivatives thereof, and is particularly preferably a polymer of 3,4-ethylenedioxy thiophene from the viewpoint of electroconductivity and heat resistance.

A solvent contained in an electroconductive polymer suspension solution according to an exemplary embodiment of the invention is preferably water, or a mixed solvent with water and a polar organic solvent such as an alcohol, acetone, acetonitrile or ethyleneglycol, and is particularly preferably water from the viewpoints of easy installation of an equipment to exhaust a solvent vapor occurring with the drying step of the electroconductive polymer suspension solution, low environmental load, and easy rejection.

An electroconductive polymer suspension solution according to an exemplary embodiment of the invention preferably has a viscosity of 10 to 1000 mPa·s, and particularly preferably has a viscosity of 50 to 500 mPa·s from the viewpoint of easy formation of the electroconductive polymer layer in the solid electrolytic capacitor.

An electroconductive polymer suspension solution containing a polyanion having a cross-linked structure, an electroconductive polymer, and a solvent can be produced by the following four steps.

(First Step)

A polyanion having a cross-linked structure is synthesized by a reaction of a cross-linking agent with a polyanion in an aqueous solvent. In this first step, the cross-linking degree of the polyanion can arbitrarily be adjusted, and thereby there is an advantage that an electroconductive polymer suspension solution having an arbitrary viscosity can be obtained.

(Second Step)

A mixture containing an electroconductive polymer is obtained by chemical oxidative polymerization of a monomer giving the electroconductive polymer by using an oxidant in water, an organic solvent or a mixed solvent of water and an organic solvent which contains a dopant consisting of an organic acid or a salt thereof. The electroconductive polymer is preferably particulate. In this second step, a solvent which has high compatibility with a lipophilic monomer can arbitrarily be selected and a monosulfonic acid can be selected as a dopant, and thereby there is an advantage that an electroconductive polymer having high polymerization degree and high crystallinity can be obtained.

A dopant is preferably at least one monosulfonic acid selected from benzenesulfonic acid, naphthalenesulfonic acid, camphorsulfonic acid, and derivatives thereof, and salts of these.

As a monomer, the monomer giving the electroconductive polymer contained in the above-mentioned electroconductive polymer suspension solution may be selected, and a monomer is preferably at least one selected from pyrrole, thiophene, furan, and derivatives thereof.

The oxidant is not particularly limited. Examples of the usable oxidant include iron(III) salts of inorganic acids such as iron(III) chloride hexahydrate, anhydrous iron(III) chloride, iron(III) nitrate nonahydrate, anhydrous ferric nitrate, iron(III) sulfate n-hydrate (n=3 to 12), ammonium iron(III) sulfate dodecahydrate, iron(III) perchlorate n-hydrate (n=1, 6) and iron(III) tetrafluoroborate; copper(II) salts of inorganic acids such as copper(II) chloride, copper(II) sulfate and copper(II) tetrafluoroborate; nitrosonium tetrafluoroborate; persulfates such as ammonium persulfate, sodium persulfate and potassium persulfate; periodates such as potassium periodate; hydrogen peroxide, ozone, potassium hexacyanoferrate(III), tetraammonium cerium(IV) sulfate dihydrate, bromine and iodine; and iron(III) salts of organic acids such as iron(III) p-toluenesulfonate. Above all, iron(III) salts of the inorganic acid or the organic acid, or persulfates are preferable, ammonium persulfate or iron(III) p-toluenesulfonate is more preferable. Iron(III) p-toluenesulfonate is still more preferable because it also functions as a dopant. The oxidant may be one kind or may be two or more kinds.

(Third Step)

The electroconductive polymer is collected from the mixture. That is, an impurity is removed from the mixture containing the electroconductive polymer to purify the electroconductive polymer. In this third step, an unreacted monomer as well as a residual metal ion and an anion derived from a oxidant can be removed from a reaction liquid which contains an electroconductive polymer obtained by chemical oxidation polymerization, and there is an advantage that an electroconductive polymer having high purity can be obtained by the purification treatment.

(Fourth Step)

An electroconductive polymer suspension solution is formed by contacting the polyanion having a cross-linked structure which is obtained in the first step and the electroconductive polymer which is obtained in the third step with an oxidant in the aqueous solvent. In this fourth step, the polyanion whose cross-linking degree is arbitrarily adjusted in the first step dopes to the electroconductive polymer purified in the third step, and there is an advantage that an electroconductive polymer suspension solution having a good dispersibility and an arbitrarily adjusted viscosity can be obtained.

And, an electroconductive polymer composition according to an exemplary embodiment of the invention is formed by drying the electroconductive polymer suspension solution. The drying is performed under the condition to remove at least 90% by weight of the solvent in the electroconductive polymer suspension solution, for example, at 105 to 200° C. for 1 to 3 hours in the case of using water as a solvent.

A solid electrolytic capacitor according to an exemplary embodiment of the invention basically has a configuration approximately similar to that of a conventional solid electrolytic capacitor except that the above-mentioned electroconductive polymer composition is used for the electroconductive polymer layer that is a solid electrolyte layer. That is, a known shape, material and the like can be adopted, and there is no limit in particular.

FIG. 1 shows one exemplary structure of a solid electrolytic capacitor according to an exemplary embodiment of the invention. The solid electrolytic capacitor shown in FIG. 1 has valve metal 1 as an anode side electrode, valve metal lead 8 connecting this valve metal 1 to external electrode 7, dielectric oxide film layer 2 obtained by anodizing the surface of valve metal 1, electroconductive polymer layer 3 as a solid electrolyte, a cathode layer consisting of graphite layer 4 and silver layer 5, electroconductive adhesive 6 connecting silver layer 5 to external electrode 7, and outer packaging resin 9 covering these.

Valve metal 1 is formed of a plate, a foil or a wire of a valve metal; a sintered body made of fine particles of a valve metal; or a porous metal subjected to a surface area enlargement treatment by etching. Examples of the valve metal include tantalum, aluminum, titanium, niobium and zirconium, and alloys of these. At least one selected from tantalum, aluminum and niobium is preferable.

Dielectric oxide film layer 2 is a layer that can be formed by the electrolytic oxidation of the surface of valve metal 1, and is also formed in the pores of a sintered body or a porous body. The thickness of dielectric oxide film layer 2 can be appropriately adjusted by the voltage of the electrolytic oxidation.

The thickness of electroconductive polymer layer 3 is preferably 5 μm or more, and more preferably 5 to 20 μm. Also, it is not specifically a problem that electroconductive polymer layer 3 is formed of an electroconductive polymer composition according to an exemplary embodiment of the invention, together with an electroconductive polymer formed by chemical oxidative polymerization or electropolymerization.

EXAMPLE

As follows, an exemplary embodiment of the invention is more specifically described based on the Examples, but an exemplary embodiment of the invention is not limited to only these Examples.

Example 1

(First Step)

A straight-chain polystyrene sulfonic acid (weight average molecular weight Mw=50,000) (20 g) which is a polyanion and a sorbitol polyglycidyl ether (0.4 g) which is a cross-linking agent were dissolved in water (100 mL) which is a solvent. The obtained solution was kept at a temperature of 80° C. and was stirred for 24 hours to react the straight-chain polystyrene sulfonic acid with the sorbitol polyglycidyl ether, and thereby to obtain a polyanion having a cross-linked structure. It was confirmed by FT-IR measurement that the straight-chain polystyrene sulfonic acid was reacted with the sorbitol polyglycidyl ether. Specifically, it was confirmed in the FT-IR spectrum that a peak derived from sulfonic group which is observed at around 1190 $cm^{-1}$ decreased and that a peak derived from sulfonate group which is observed at around 1348 $cm^{-1}$ increased.

(Second Step)

3,4-ethylenedioxy thiophene (5 g) which is a monomer giving an electroconductive polymer, camphor sulfonic acid (5 g) which is a dopant, and iron (III) p-toluenesulfonate (45 g) which functions as an oxidant and a dopant were dissolved in ethanol (150 mL) as a solvent. The obtained solution was stirred under room temperature for 24 hours to perform oxidation polymerization of the monomer.

(Third Step)

The mixture obtained by the second step was filtered by using a reduced pressure filtration apparatus to obtain an electroconductive polymer particulate. The obtained electroconductive polymer particulate was washed with pure water to remove the excessive oxidant and the excessive dopant. The washing with pure water was performed repeatedly until the pH of the filtrate came to be 6 to 7. After the pH of the filtrate came to be 6 to 7, it was washed with ethanol to remove the monomer, the oxidant and the reacted oxidant (iron (II) p-toluenesulfonate). The washing with ethanol was performed until the color of the filtrate came to be colorless and transparent.

(Fourth Step)

The electroconductive polymer particulate (2.5 g) washed in the third step was dispersed in water (50 mL) and then the aqueous solution (16.5 g) of 20% by weight of the polystyrene sulfonic acid having a cross-linked structure which was obtained by the first step was added thereto. Ammonium persulfate (7.5 g) as an oxidant was added to this mixture liquid and it was stirred under room temperature for 24 hours. The viscosity of the obtained electroconductive polymer suspension solution was measured by a vibration type viscometer (trade name: VM-10A-L) made by CBC Co., Ltd.

(Fifth Step)

The electroconductive polymer suspension solution obtained by the fourth step was dropped onto a glass substrate in an amount of 100 μl, and was dried in a thermostatic chamber set at 125° C. for 1 hour to form an electroconductive polymer composition film. After that, the surface resistance (Ω/□) and the film thickness of the obtained electroconductive polymer composition film were measured by four-terminal method, and the electroconductivity (S/cm) was calculated.

The viscosity of the obtained electroconductive polymer suspension solution and the electroconductivity of the obtained electroconductive polymer composition film are shown in Table 2.

Example 2

An electroconductive polymer suspension solution and an electroconductive polymer composition film were produced in the same manner as in Example 1 except that a straight-chain poly(maleic acid) (weight average molecular weight Mw=50,000) is used as a polyanion in the first step. In the same manner as in Example 1, the viscosity of the produced electroconductive polymer suspension solution and the electroconductivity of the produced electroconductive polymer composition film were evaluated and the results are shown in Table 2.

Example 3

An electroconductive polymer suspension solution and an electroconductive polymer composition film were produced in the same manner as in Example 1 except that a sorbitol polyglycidyl ether (0.1 g) was used as a cross-linking agent in the first step. In the same manner as in Example 1, the viscosity of the produced electroconductive polymer suspension solution and the electroconductivity of the produced electroconductive polymer composition film were evaluated and the results are shown in Table 2.

Example 4

An electroconductive polymer suspension solution and an electroconductive polymer composition film were produced in the same manner as in Example 1 except that a sorbitol polyglycidyl ether (2 g) was used as a cross-linking agent in the first step. In the same manner as in Example 1, the viscosity of the produced electroconductive polymer suspension solution and the electroconductivity of the produced electroconductive polymer composition film were evaluated and the results are shown in Table 2.

Comparative Example 1

An electroconductive polymer suspension solution and an electroconductive polymer composition film were produced in the same manner as in Example 1 except that the first step was not carried out and that a straight-chain polystyrene sulfonic acid (weight average molecular weight Mw=50,000) was used in the fourth step. In the same manner as in Example 1, the viscosity of the produced electroconductive polymer suspension solution and the electroconductivity of the produced electroconductive polymer composition film were evaluated and the results are shown in Table 2.

Comparative Example 2

An electroconductive polymer suspension solution and an electroconductive polymer composition film were produced in the same manner as in Comparative Example 1 except that pullulan (6 g) which was a polysaccharide thickener was added to the electroconductive polymer suspension solution obtained by the fourth step to adjust the viscosity of the electroconductive polymer suspension solution to 100 mPa·s. In the same manner as in Example 1, the viscosity of the produced electroconductive polymer suspension solution and the electroconductivity of the produced electroconductive polymer composition film were evaluated and the results are shown in Table 2.

TABLE 2

|  | viscosity (mPa · s) | electroconductivity (S/cm) |
|---|---|---|
| Example 1 | 101 | 215 |
| Example 2 | 98 | 137 |

TABLE 2-continued

| | viscosity (mPa·s) | electroconductivity (S/cm) |
|---|---|---|
| Example 3 | 19 | 220 |
| Example 4 | 605 | 208 |
| Comparative Example 1 | 2 | 217 |
| Comparative Example 2 | 100 | 85 |

Example 5

A solid electrolytic capacitor was produced using an electroconductive polymer suspension solution produced in Example 1. Example 5 is described with reference to the sectional view of the solid electrolytic capacitor which is shown in FIG. 1. As shown in FIG. 1, the solid electrolytic capacitor produced in Example 5 has valve metal 1 as an anode side electrode, valve metal lead 8 connecting this valve metal 1 to external electrode 7, dielectric oxide film layer 2 obtained by anodizing the surface of valve metal 1, electroconductive polymer layer 3 as a solid electrolyte, a cathode layer consisting of graphite layer 4 and silver layer 5, electroconductive adhesive 6 connecting silver layer 5 to external electrode 7, and outer packaging resin 9 covering these. Note that, a sintered body of a tantalum fine powder was chosen as valve metal 1.

The method for producing a solid electrolytic capacitor is explained. A sintered body of a tantalum fine powder as valve metal 1 was anodized in a phosphoric acid aqueous solution to obtain a pellet of 3.6 mm×1.8 mm×4.5 mm in which whole surface of the tantalum fine powder was covered with dielectric oxide film layer 2. Next, the pellet was once immersed to and pulled out of the electroconductive polymer suspension solution produced in Example 1, and then it was reacted and dried at 125° C. to form electroconductive polymer layer 3 with an uniform thickness of 10 μm. On electroconductive polymer layer 3 were sequentially formed a cathode layer consisting of graphite layer 4 and silver layer 5, electroconductive adhesive 6 and external electrode 7, and outer packaging resin 9 to produce a solid electrolytic capacitor having a capacity of 470 μF and an outer surface area of 0.616 cm$^2$.

The ESR at a frequency of 100 kHz and the LC at 2.5 V of the produced solid electrolytic capacitor having a rated voltage of 2.5 V were evaluated. The result of ESR measurement is shown in Table 3. Further, the result of LC measurement was normalized to the LC value per capacity C, and it is shown in Table 3.

Example 6

A solid electrolytic capacitor was produced in the same manner as in Example 5 except that the electroconductive polymer suspension solution produced in Example 2 was used. In the same manner as in Example 5, the ESR at a frequency of 100 kHz and the LC at 2.5 V of the produced solid electrolytic capacitor were evaluated. The result of ESR measurement is shown in Table 3. Further, the result of LC measurement was normalized to the LC value per capacity C, and it is shown in Table 3.

Example 7

A solid electrolytic capacitor was produced in the same manner as in Example 5 except that the electroconductive polymer suspension solution produced in Example 3 was used. In the same manner as in Example 5, the ESR at a frequency of 100 kHz and the LC at 2.5 V of the produced solid electrolytic capacitor were evaluated. The result of ESR measurement is shown in Table 3. Further, the result of LC measurement was normalized to the LC value per capacity C, and it is shown in Table 3.

Example 8

A solid electrolytic capacitor was produced in the same manner as in Example 5 except that the electroconductive polymer suspension solution produced in Example 4 was used. In the same manner as in Example 5, the ESR at a frequency of 100 kHz and the LC at 2.5 V of the produced solid electrolytic capacitor were evaluated. The result of ESR measurement is shown in Table 3. Further, the result of LC measurement was normalized to the LC value per capacity C, and it is shown in Table 3.

Example 9

For valve metal 1, a sintered body of a tantalum fine powder was chosen. The sintered body of a tantalum fine powder as valve metal 1 was anodized in a phosphoric acid aqueous solution to obtain a pellet having the same size as that of Example 5 in which whole surface of the tantalum fine powder was covered with dielectric oxide film layer 2. Next, the pellet covered with this dielectric oxide film layer 2 was immersed to an ethanol solution of 20% by weight of ferric p-toluenesulfonate which is an oxidant for 10 minutes and were dried at 60° C. for 30 minutes, and then it was immersed to a solution of 3,4-ethylenedioxy thiophene for 10 minutes and were kept at room temperature for 30 minutes for chemical oxidative polymerization of 3,4-ethylenedioxy thiophene. A series of polymerization operations including these immersing to the oxidant solution, drying, and immersing to the 3,4-ethylenedioxy thiophene solution were repeatedly performed five times to form a first electroconductive polymer layer.

The pellet in which the first electroconductive polymer layer was formed by chemical oxidative polymerization was immersed to and pulled out of the electroconductive polymer suspension solution produced in Example 1, and then it was reacted and dried at 125° C. to form a second electroconductive polymer layer. The thickness of electroconductive polymer layer 3 comes to be 10 μm by combining the first electroconductive polymer layer and the second electroconductive polymer layer. On the second electroconductive polymer layer were sequentially formed a cathode layer consisting of graphite layer 4 and silver layer 5, electroconductive adhesive 6 and external electrode 7, and outer packaging resin 9 to produce a solid electrolytic capacitor having a capacity of 470 μF and an outer surface area of 0.616 cm$^2$.

In the same manner as in Example 5, the ESR at a frequency of 100 kHz and the LC at 2.5 V of the produced solid electrolytic capacitor were evaluated. The result of ESR measurement is shown in Table 3. Further, the result of LC measurement was normalized to the LC value per capacity C, and it is shown in Table 3.

Comparative Example 3

A solid electrolytic capacitor was produced in the same manner as in Example 5 except that the electroconductive polymer suspension solution produced in Comparative Example 1 was used. In the same manner as in Example 5, the ESR at a frequency of 100 kHz and the LC at 2.5 V of the produced solid electrolytic capacitor were evaluated. The result of ESR measurement is shown in Table 3. Further, the result of LC measurement was normalized to the LC value per capacity C, and it is shown in Table 3.

Comparative Example 4

A solid electrolytic capacitor was produced in the same manner as in Example 5 except that the immersing and drying steps of the pellet to the electroconductive polymer suspension solution produced in Comparative Example 1 were performed five times as the method for forming an electroconductive polymer layer. In the same manner as in Example 5, the ESR at a frequency of 100 kHz and the LC at 2.5 V of the produced solid electrolytic capacitor were evaluated. The result of ESR measurement is shown in Table 3. Further, the result of LC measurement was normalized to the LC value per capacity C, and it is shown in Table 3.

Comparative Example 5

A solid electrolytic capacitor was produced in the same manner as in Example 5 except that the electroconductive polymer suspension solution produced in Comparative Example 2 was used. In the same manner as in Example 5, the ESR at a frequency of 100 kHz and the LC at 2.5 V of the produced solid electrolytic capacitor were evaluated. The result of ESR measurement is shown in Table 3. Further, the result of LC measurement was normalized to the LC value per capacity C, and it is shown in Table 3.

TABLE 3

|  | ESR (mΩ) | LC/C (A/F) | thickness of electroconductive polymer layer (μm) |
| --- | --- | --- | --- |
| Example 5 | 9.9 | 0.005 | 10 |
| Example 6 | 13.4 | 0.007 | 10 |
| Example 7 | 8.6 | 0.061 | 5 |
| Example 8 | 13.5 | 0.005 | 35 |
| Example 9 | 10.1 | 0.006 | 10 |
| Comparative Example 3 | 7.3 | 0.282 | 2 |
| Comparative Example 4 | 14.2 | 0.006 | 10 |
| Comparative Example 5 | 15.9 | 0.007 | 10 |

As indicated in Table 2, every electroconductive polymer suspension solution (Examples 1 to 4) according to an exemplary embodiment of the invention has a viscosity higher than that of the electroconductive polymer suspension solution produced in Comparative Example 1, Also, every electroconductive polymer composition film (Examples 1 to 4) according to an exemplary embodiment of the invention shows a electroconductivity higher than that of the electroconductive polymer composition film produced in Comparative Example 2. An exemplary embodiment of the invention undoubtedly has an advantageous effect from the results that the electroconductive polymer suspension solution has a high viscosity and that the electroconductivity of the electroconductive polymer composition film obtained from the electroconductive polymer suspension solution is not damaged. It is due to no decrease of electroconductivity by a polyanion having a cross-linked structure, unlike to a conventional insulating thickener at all, even if it exists in an electroconductive polymer composition obtained from an electroconductive polymer suspension solution because it is a dopant of an electroconductive polymer. Also, from comparison of the result of Example 2 with the results of Examples 1, 3 and 4, it is found that the electroconductivity in the case of using a polystyrene sulfonic acid as a main chain of a polyanion is superior to that in the case of using a polymaleic acid.

Also, from Table 3, a solid electrolytic capacitor (Examples 5 to 9) using an electroconductive polymer composition according to an exemplary embodiment of the invention as an electroconductive polymer layer has both of low ESR and low LC, in comparison with the solid electrolytic capacitors produced in Comparative Examples 3 to 5. Low ESR is achieved due to no generation of interface resistance because an electroconductive polymer layer does not contain an insulating thickener and because an electroconductive polymer layer can be formed only by one set of immersing and drying step to an electroconductive polymer suspension solution and the electroconductive polymer layer does not come to have layered formation. Also, low LC is achieved due to formation of an electroconductive polymer layer having an enough thickness (5 μm or more) by one set of immersing and drying step to an electroconductive polymer suspension solution because an electroconductive polymer suspension solution has a high viscosity. From comparison of the results of Examples 5 and 9 with the results of Examples 7 and 8, an electroconductive polymer layer preferably has a thickness of more than 5 μm from the viewpoint of LC lowering and an electroconductive polymer layer preferably has a thickness of less than 35 μm from the viewpoint of ESR lowering. From comparison of the result of Example 5 with the result of Example 9, it is not at all a problem that an electroconductive polymer layer is formed of an electroconductive polymer composition obtained from an electroconductive polymer suspension solution, together with an electroconductive polymer composition obtained by chemical oxidative polymerization.

EXPLANATION OF SYMBOL 1 valve metal
2 dielectric oxide film layer
3 electroconductive polymer layer
4 graphite layer
5 silver layer
6 electroconductive adhesive
7 external electrode
8 valve metal lead
9 outer packaging resin

What is claimed is:
1. An electroconductive polymer composition formed by drying an electroconductive polymer suspension solution which comprises a polyanion having a cross-linked structure, an electroconductive polymer, and a solvent,
wherein the polyanion having a cross-linked structure has a main chain of a polystyrene sulfonic acid,
wherein the polyanion having a cross-linked structure has a structure obtained by cross-linking a straight-chain polystyrene sulfonic acid using a cross-linking agent, and
wherein the cross-linking agent is a compound having two or more epoxy groups selected from the group consisting of sorbitol polyglycdyl ethers, glycerol ethers, pentaerythritol polyglycidyl ethers, diglycerol polyglycidyl ethers, glycerol polyglycidyl ethers, trimethylolpropane polyglycidyl ethers, resorcinol diglycidyl ether, neopentyl glycol diglycidyl ether, 1,6-hexanediol diglycidyl ether, polyethylene glycol diglycidyl ethers, polypropylene glycol diglycidyl ethers, polybutadiene diglycidyl ethers, diglycidvl o-phthalate, hydroquinone diglycidyl ethers, diglycidyl terephthalate, dibromo neopentyl glycol diglycidyl ether, and bisphenol A type epoxy resins.

2. The electroconductive polymer composition according to claim 1, wherein the electroconductive polymer is a polymer obtained by polymerizing at least one monomer selected from pyrrole, thiophene, furan, and derivatives thereof.

3. The eleetroconductive polymer composition according to claim 1, wherein the electroconductive polymer suspension solution has a viscosity of 10 to 1000 mPa·s.

4. A method for producing an electroconductive polymer composition, comprising:
   a first step of synthesizing a polyanion having a cross-linked structure by a reaction of a cross-linking agent with a polyanion in an aqueous solvent;
   a second step of obtaining a mixture containing an electroconductive polymer by chemical oxidative polymerization of a monomer giving the electroconductive polymer by using an oxidant in a solvent containing a dopant consisting of an organic acid or a salt thereof,
   a third step of collecting the electroconductive polymer from the mixture,
   a fourth step of forming an electroconductive polymer suspension solution by mixing the polyanion having a cross-linked structure and the electroconductive polymer with an oxidant in the aqueous solvent, and
   a fifth step of drying the electroconductive polymer suspension solution,
   wherein the polyanion having a cross-linked structure has a main chain of a polystyrene sulfonic acid,
   wherein the polyanion having a cross-linked structure has a structure obtained by cross-linking a straight-chain polystyrene sulfonic acid using a cross-linking agent, and
   wherein the cross-linking agent is a compound having two or more epoxy groups selected from the group consisting of sorbitol potyglyeidyl ethers, polyglycerol polyglycidyl ethers, pentaerythritol polyglycidyl ethers, diglycerol polyglycidyl ethers, glycerol polyglycidyl ethers, trimethylolpropane polyglycidyl ethers, resorcinol diglycidyl ether, neopentyl glycol diglycidyl ether, 1,6-hexanediol diglycidyl ether, polyethylene glycol diglycidyl ethers, polypropylene glycol diglycidyl ethers, polybutadiene diqlycidyl ethers, diglycidyl o-phthalate, hydroquinone diglycidyl ethers, digivcidyl terephthalate, dibromo neopentyl glycol diglycidyl ether, and bisphenol A type epoxy resins.

5. The method for producing an electroconductive polymer composition according to claim 4, wherein the dopant is at least one monosulfonic acid selected from benzenesulfonic acid, naphthalcnesulfonic acid, camphorsulfonic acid, and derivatives thereof, and salts of these.

6. The method for producing an electroconductive polymer composition according to claim 4, wherein the monomer is at least one selected from pyrrole, thiophene, furan, and derivatives thereof.

7. A solid electrolitie capacitor obtained by using the electroconductive polymer composition according to claim 1 for an electroconductive polymer layer that is a solid electrolyte layer.

8. The solid electrolytic capacitor according to claim 7 obtained by forming the electroconductive polymer composition with a thickness of 5μm or more as the electroconductive polymer layer that is the solid electrolyte layer on a dielectric film layer which is formed on a surface of an anode conductor consisting of a valve metal.

* * * * *